US008843520B2

(12) United States Patent
Saito

(10) Patent No.: US 8,843,520 B2
(45) Date of Patent: Sep. 23, 2014

(54) DOCUMENT MANAGEMENT SYSTEM AND METHOD THAT DETECTS PRESENCE OF USER INACCESSIBLE FILES AND FOLDERS, AND COMPUTER-READABLE MEDIUM STORING A COMPUTER PROGRAM FOR IMPLEMENTING THE METHOD

(75) Inventor: Shigemi Saito, Yokohama (JP)

(73) Assignee: Canon Kabushiki Kaisha (JP)

( * ) Notice: Subject to any disclaimer, the term of this patent is extended or adjusted under 35 U.S.C. 154(b) by 706 days.

(21) Appl. No.: 11/091,133

(22) Filed: Mar. 28, 2005

(65) Prior Publication Data

US 2005/0216469 A1    Sep. 29, 2005

(30) Foreign Application Priority Data

Mar. 26, 2004    (JP) ................................ 2004-093213

(51) Int. Cl.
   *G06F 17/30*    (2006.01)
(52) U.S. Cl.
   CPC .............................. *G06F 17/30067* (2013.01)
   USPC ........................................................ 707/783
(58) Field of Classification Search
   CPC .......... G06F 17/30091; G06F 17/3028; G06F 17/30067; G06F 12/1458; G06F 21/6209; G06F 2221/2141
   USPC ......................................... 707/705, 781, 783
   See application file for complete search history.

(56) References Cited

U.S. PATENT DOCUMENTS

| | | | | |
|---|---|---|---|---|
| 6,470,353 | B1* | 10/2002 | Yaung et al. | 707/103 R |
| 6,985,948 | B2* | 1/2006 | Taguchi et al. | 709/225 |
| 2001/0008554 | A1* | 7/2001 | Finnigan | 379/88.02 |
| 2002/0069212 | A1* | 6/2002 | Leonardos | 707/707 |
| 2002/0136410 | A1* | 9/2002 | Hanna | 380/277 |
| 2003/0046313 | A1* | 3/2003 | Leung et al. | 707/707 |
| 2003/0046345 | A1* | 3/2003 | Wada et al. | 709/205 |
| 2003/0120655 | A1* | 6/2003 | Ohwada et al. | 707/707 |
| 2003/0154386 | A1* | 8/2003 | Wittkotter | 713/193 |

(Continued)

FOREIGN PATENT DOCUMENTS

JP    2002-73419 A    3/2002

OTHER PUBLICATIONS

Tulloch, Mitch. "Windows Server 2003 in a Nutshell." O'Reilly Media, Sep. 23, 2003. Chapter 3: Task Map.*

(Continued)

*Primary Examiner* — Robert Beausoliel, Jr.
*Assistant Examiner* — Alexandria Bromell
(74) *Attorney, Agent, or Firm* — Rossi, Kimms & McDowell LLP

(57) ABSTRACT

A document managing system which can detect the presence of inaccessible files and folders. In the document managing system, a file as a research object for which the right of access has been set is acquired, and a file user set for which the right of access to the research object has been set is acquired. A folder to which the research object belongs is acquired, and a folder user set for which the right of access to the folder has been set is acquired. If the intersection of the file user set and the folder user set is an empty set, it is determined that determines that there is no user who can access the research object.

18 Claims, 8 Drawing Sheets

(56) References Cited

U.S. PATENT DOCUMENTS

| | | | |
|---|---|---|---|
| 2004/0006594 A1* | 1/2004 | Boyer et al. | 709/204 |
| 2004/0088608 A1* | 5/2004 | Nguyen et al. | 714/49 |
| 2004/0165702 A1* | 8/2004 | Finnigan | 379/88.02 |
| 2004/0210796 A1* | 10/2004 | Largman et al. | 714/20 |
| 2005/0114658 A1* | 5/2005 | Dye et al. | 713/165 |
| 2008/0139252 A1* | 6/2008 | Jeon | 455/566 |
| 2008/0263112 A1* | 10/2008 | Shaath et al. | 707/707 |

OTHER PUBLICATIONS

Boswell, William. "Inside Windows 2000 Server," published by Sams in 1999. pp. 698-716.*

Williamson, Heather. "Dreamweaver in a Nutshell," published by O'Reilly in 2002, p. 152.*

William Boswell, Inside Windows 2000 Server, Sams, 1999.*

Heather Williamson, Dreamweaver in a Nutshell, O'Reilly, 2002.*

* cited by examiner

DOCUMENT MANAGEMENT SYSTEM AND METHOD THAT DETECTS PRESENCE OF USER INACCESSIBLE FILES AND FOLDERS, AND COMPUTER-READABLE MEDIUM STORING A COMPUTER PROGRAM FOR IMPLEMENTING THE METHOD

BACKGROUND OF THE INVENTION

1. Field of the Invention

The present invention relates to a document managing system, a document managing method, and a program for implementing the method, and more particularly to a document managing system and a document managing method, which are capable of separately setting the rights of access to files and folders, and parent folders and child folders, and a program for implementing the method.

2. Description of the Related Art

In recent years, a document managing system which is capable of separately setting the rights of access to files and folders has been proposed (for example, Japanese Laid-Open Patent Publication No. 2002-73419).

In the case where a system in which the rights of access to files and folders can be set is constructed, for example, in a document managing system (FIG. 7) in which users U110 and U111, folders F100 and F101, and files F102 and F103 are registered and the rights of access to the folders and files are separately set, the rights of access can be set such that the right of access to the folder F101 is given to the user U110, and the right of access to the file F103 in the folder F101 is given to the user U111.

In the document managing system, however, if the right of access is improperly set, there can be the case that any user cannot access a certain file or folder.

For example, in the case where the rights of access are given to the users U110 and U111 as shown in FIG. 7, the user U110 can access the folder F101, but cannot access the file F103 in the folder F101. The user U111 is given the right of can access to the file F103, but cannot access the folder F101 containing the file F103, and therefore actually cannot access the file F103.

Also, as shown in FIG. 8, in the case where there are users who have the right of access to an object file and users who have the right of access to a folder to which the object file belongs, users who have the right of access to both the object file and the folder to which the object file belongs (users who belong to an intersection hatched in FIG. 8) can actually access the file. Therefore, if the intersection is empty, no user can access the file.

Further, as shown in FIG. 9, in the case where there are users who have the right of access to an object folder and users who have the right of access to a parent folder of the object folder, users who have the right of access to both the object folder and the parent folder of the object folder (users who belong to an intersection hatched in FIG. 9) can actually access the folder. Therefore, if the intersection is empty, no user can access the folder.

Once a file or a folder has been made inaccessible by anyone as shown in FIGS. 7 to 9, the user cannot access the file or the folder any more, or a privileged user like an administrator manually has to check and correct the right of access.

Further, in a document managing system in which the presence of folders and files itself is not presented for users who have no access right, there is the problem that the presence of such files which cannot be accessed by any one itself is hidden.

SUMMARY OF THE INVENTION

It is an object to provide a document managing system and a document managing method, which are capable of detecting the presence of inaccessible files and folders, to thereby enable positive elimination of inaccessible files and folders, and a program for implementing the method.

To attain the above object, in a first aspect of the present invention, there is provided a document managing system that manages a plurality of tree-structured folders and files, and separately sets rights of access to the respective files and folders to be managed, comprising a research object acquiring unit that acquires a file as a research object for which one of the rights of access has been set, a file user set acquiring unit that acquires a file user set for which the right of access to the research object has been set, a folder acquiring unit that acquires a folder to which the research object belongs, a folder user set acquiring unit that acquires a folder user set for which another one of the rights of access to the acquired folder has been set, and a determining unit that determines that there is no user who can access the research object when an intersection of the file user set and the folder user set is an empty set.

To attain the above object, in a second aspect of the present invention, there is provided a document managing system that manages a plurality of tree-structured folders and files, and separately sets rights of access to the respective folders to be managed, comprising a research object acquiring unit that acquires a folder as a research object for which one of the rights of access has been set, a first user set acquiring unit that acquires a first user set for which the right of access to the research object has been set, a parent folder acquiring unit that acquires a parent folder of the folder as the research object, a second user set acquiring unit that acquires a second user set for which another one of the rights of access to the parent folder acquired by the parent folder acquiring unit has been set, and a determining unit that determines that there is no user who can access the research object when an intersection of the first user set and the second user set is an empty set.

To attain the above object, in a third aspect of the present invention, there is provided a document managing system that manages a plurality of tree-structured folders and files, and separately sets rights of access to the respective files and folders to be managed, comprising a research object acquiring unit that acquires a file as a research object for which one of the rights of access has been set, a file user set acquiring unit that acquires a file user set for which the right of access to the research object has been set, a folder acquiring unit that acquires a folder to which the file as the research object belongs, a recursive parent folder acquiring unit that when the acquired folder is not a root folder, recursively acquires a parent folder of the acquired folder until the acquired folder becomes the root folder, a folder user set acquiring unit that acquires a folder user set for which another one of the rights of access to the acquired root folder has been set, and a determining unit that determines that there is no user who can access the research object when an intersection of the file user set and the folder user set is an empty set.

To attain the above object, in a fourth aspect of the present invention, there is provided a document managing system that manages a plurality of tree-structured folders and files, and separately sets rights of access to the respective folders to be managed, comprising a research object acquiring unit that acquires a folder as a research object for which one of the rights of access has been set, a first user set acquiring unit that acquires a first user set for which the right of access to the research object has been set, a parent folder acquiring unit that acquires a parent folder of the folder as the research object, a recursive parent folder acquiring unit that when the acquired folder is not a root folder, recursively acquires a parent folder of the folder until the acquired folder becomes the root folder, a second user set acquiring unit that acquires a second user set for which another one of the rights of access to the acquired root folder has been set, and a determining unit that determines that there is no user who can access the research object when an intersection of the first user set and the second user set is an empty set.

Preferably, the document managing system further comprises a notifying unit that notify to a user by using screen display, printing, sound output, log recording, or mail transmission, when the determining unit determines that there is no user who can access the research object.

Preferably, the document managing system comprises a coping process acquiring unit that acquires a coping process enabling a user to access the research object when the determining unit determines that there is no user who can access the research object.

Preferably, the research object acquiring unit comprises a display device that displays a file or a folder as the research object such that a user can select the file or the folder.

Preferably, the research object acquiring unit is operable when a file or a folder which is one of the files or the folders for which the rights of access have been set has not yet been acquired as the research object, to acquire the file or the folder as the research object.

Preferably, the document managing system further comprises an excluded user acquiring unit that acquires an excluded user set from users who can access the research object when the intersection is not an empty set, and the determining unit determines that there is no user who can access the research object when an intersection of the intersection and a complementary set of the excluded user set is an empty set.

Preferably, the document managing system comprises a timing acquiring unit that acquires timing in which the determining unit determines whether there is any user who can access the research object, and a present time acquiring unit that acquires a present time at regular intervals, and the determining unit determines whether there is any user who can access the research object when the acquired present time corresponds to the acquired timing.

To attain the above object, in a fifth aspect of the present invention, there is provided a document managing method of managing a plurality of tree-structured folders and files, and separately setting rights of access to the respective files and folders to be managed, comprising a research object acquiring step of acquiring a file as a research object for which one of the rights of access has been set, a file user set acquiring step of acquiring a file user set for which the right of access to the research object has been set, a folder acquiring step of acquiring a folder to which the research object belongs, a folder user set acquiring step of acquiring a folder user set for which another one of the rights of access to the acquired folder has been set, and a determining step of determining that there is no user who can access the research object when an intersection of the file user set and the folder user set is an empty set.

To attain the above object, in a sixth aspect of the present invention, there is provided a document managing method of managing a plurality of tree-structured folders and files, and separately setting rights of access to the respective files and folders to be managed, comprising a research object acquiring step of acquiring a folder as a research object for which one of the rights of access has been set, a first user set acquiring step of acquiring a first user set for which the right of access to the research object has been set, a parent folder acquiring step of acquiring a parent folder of the folder as the research object, a second user set acquiring step of acquiring a second user set for which another one of the rights of access to the parent folder acquired by the parent folder acquiring step has been set, a determining step of determining that there is no user who can access the research object when an intersection of the first user set and the second user set is an empty set.

To attain the above object, in a seventh aspect of the present invention, there is provided a document managing method of managing a plurality of tree-structured folders and files, and separately setting rights of access to the respective files and folders to be managed, comprising a research object acquiring step of acquiring a file as a research object for which one of the rights of access has been set, a file user set acquiring step of acquiring a file user set for which the right of access to the research object has been set, a folder acquiring step of acquiring a folder to which the file as the research object belongs, a recursive parent folder acquiring step of recursively acquiring a parent folder of the acquired folder until the acquired folder becomes the root folder when the acquired folder is not a root folder, a folder user set acquiring step of acquiring a folder user set for which another one of the rights of access to the acquired root folder has been set, and a determining step of determining that there is no user who can access the research object when an intersection of the file user set and the folder user set is an empty set.

To attain the above object, in an eighth aspect of the present invention, there is provided a document managing method of managing a plurality of tree-structured folders and files, and separately setting rights of access to the respective folders to be managed, comprising a research object acquiring step of acquiring a folder as a research object for which one of the rights of access has been set, a first user set acquiring step of acquiring a first user set for which the right of access to the research object has been set, a parent folder acquiring step of acquiring a parent folder of the folder as the research object, a recursive parent folder acquiring step of recursively acquiring a parent folder of the folder until the acquired folder becomes the root folder when the folder is not a root folder, a second user set acquiring step of acquiring a second user set for which another one of the rights of access to the acquired root folder has been set, and a determining step of that there is no user who can access the research object when an intersection of the first user set and the second user set is an empty set.

Preferably, the document managing method further comprises a notifying step of notifying to a user by using screen display, printing, sound output, log recording, or mail transmission, when in the determining step it is determined that there is no user who can access the research object.

Preferably, the document managing method comprises a coping process acquiring step of acquiring a coping process enabling a user to access the research object when in the determining step it is determined that there is no user who can access the research object.

Preferably, the research object acquiring step comprises a display step of displaying a file or a folder as the research object such that a user can select the file or the folder.

Preferably, the research object acquiring step is operable when a file or a folder which is one of the files or the folders for which the rights of access have been set has not yet been acquired as the research object, to acquire the file or the folder as the research object.

Preferably, the document managing method further comprises an excluded user acquiring step of acquiring an excluded user set from users who can access the research object when the intersection is not an empty set, and the determining step it is determined that there is no user who can access the research object when an intersection of the intersection and a complementary set of the excluded user set is an empty set.

Preferably, the document managing method comprises a timing acquiring step of acquiring timing in which it is determined whether there is any user who can access the research object, and a present time acquiring step of acquiring a present time at regular intervals, and the determining step it is determined whether there is any user who can access the research object when the acquired present time corresponds to the acquired timing.

To attain the above object, in a ninth aspect of the present invention, there is provided a program for causing a computer to execute a document managing method of managing a plurality of tree-structured folders and files, and separately setting rights of access to the respective files and folders to be managed, comprising a research object acquiring module for acquiring a file as a research object for which one of the rights of access has been set, a file user set acquiring module for acquiring a file user set for which the right of access to the research object has been set, a folder acquiring module for acquiring a folder to which the research object belongs, a folder user set acquiring module for acquiring a folder user set for which another one of the rights of access to the acquired folder has been set, and a determining module for determining that there is no user who can access the research object when an intersection of the file user set and the folder user set is an empty set.

To attain the above object, in a tenth aspect of the present invention, there is provided a program for causing a computer to execute a document managing method of managing a plurality of tree-structured folders and files, and separately setting rights of access to the respective files and folders to be managed, comprising a research object acquiring module for acquiring a folder as a research object for which one of the rights of access has been set, a first user set acquiring module for acquiring a first user set for which the right of access to the research object has been set, a parent folder acquiring module for acquiring a parent folder of the folder as the research object, a second user set acquiring module for acquiring a second user set for which another one of the rights of access to the parent folder acquired by the parent folder acquiring module has been set, and a determining module for determining that there is no user who can access the research object when an intersection of the first user set and the second user set is an empty set.

To attain the above object, in an eleventh aspect of the present invention, there is provided a program for causing a computer to execute a document managing method of managing a plurality of tree-structured folders and files, and separately setting rights of access to the respective files and folders to be managed, comprising a research object acquiring module for acquiring a file as a research object for which one of the rights of access has been set, a file user set acquiring module for acquiring a file user set for which the right of access to the research object has been set, a folder acquiring module for acquiring a folder to which the file as the research object belongs, a recursive parent folder acquiring module for recursively acquiring a parent folder of the acquired folder until the acquired folder becomes the root folder when the acquired folder is not a root folder, a folder user set acquiring module for acquiring a folder user set for which another one of the rights of access to the acquired root folder has been set, and a determining module for determining that there is no user who can access the research object when an intersection of the file user set and the folder user set is an empty set.

To attain the above object, in a twelfth aspect of the present invention, there is provided a program for causing a computer to execute a document managing method of managing a plurality of tree-structured folders and files, and separately setting rights of access to the respective folders to be managed, comprising a research object acquiring module for acquiring a folder as a research object for which one of the rights of access has been set, a first user set acquiring module for acquiring a first user set for which the right of access to the research object has been set, a parent folder acquiring module for acquiring a parent folder of the folder as the research object, a recursive parent folder acquiring module for recursively acquiring a parent folder of the folder until the acquired folder becomes the root folder when the folder is not a root folder, a second user set acquiring module for acquiring a second user set for which another one of the rights of access to the acquired root folder has been set, and a determining module for determining that there is no user who can access the research object when an intersection of the first user set and the second user set is an empty set.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
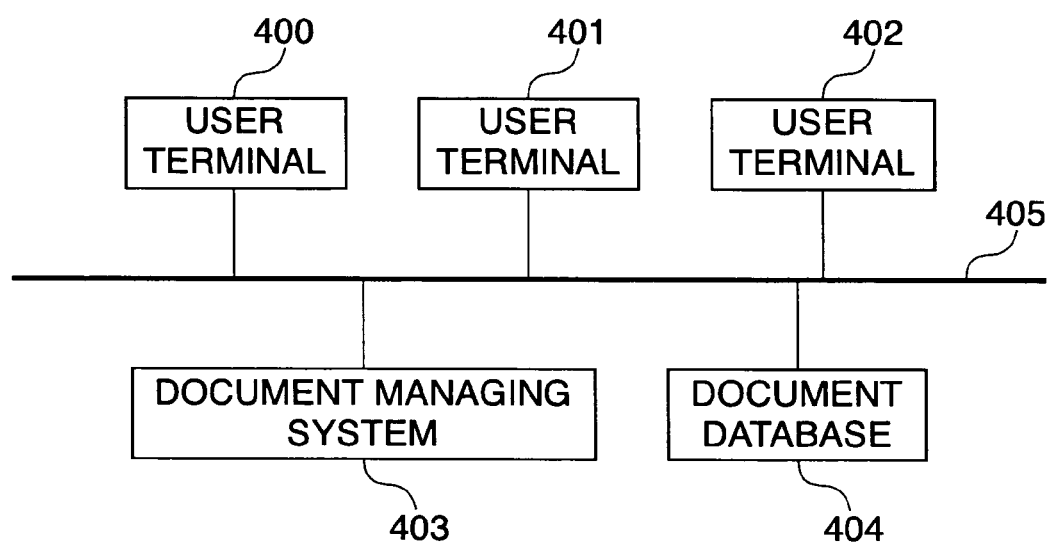
FIG. 1 is a block diagram showing the construction of a network including a document managing system according to a first embodiment of the present invention.

FIG. 1 is a block diagram showing the construction of a network including a document managing system according to an embodiment of the present invention. It should be noted that the constructions of networks including document managing systems according to second to fifth embodiments of the present invention, described later, are identical with the construction in FIG. 1, and description thereof is therefore omitted.

As shown in FIG. 1, a document managing system 403 is connected to user terminals 400, 401, and 402, and a document database 404 including a plurality of tree-structured folders and files which can be stored in the respective folders.

The document managing system 403 manages the files and folders in the document database 404, and separately sets the rights of access to files and folders and parent folders and child folders in the document database 404, for the user terminals 400, 401, and 402. Also, the document managing system 403 carries out a process for checking whether or not there is any user which can actually access files or folders in the document database 404 for which the rights of access have been set (hereinafter referred to as "the accessibility researching process"), by a method described later with reference to FIGS. 2 to 6.

The document managing system 403 is implemented by a computer that is comprised of a CPU which performs actual processing operations, a RAM which loads programs and serves as a working area, storage media (such as a hard disk, a ROM, a removable disk (e.g. a floppy (registered trademark) disk or a CD-ROM)) that store programs and various kinds of data for carrying out a process corresponding to a flow chart, described later, a keyboard and a pointing device for performing various operations, a display for displaying e.g. a document to be processed, a network interface for connecting to a network, and so forth.

A program to be executed by the CPU may be supplied from the storage medium, or loaded from an external apparatus via the network. It should be noted that the present embodiment is realized by the computer executing a program, but a part or all of the present embodiment may be implemented by hardware.

Figure 2:
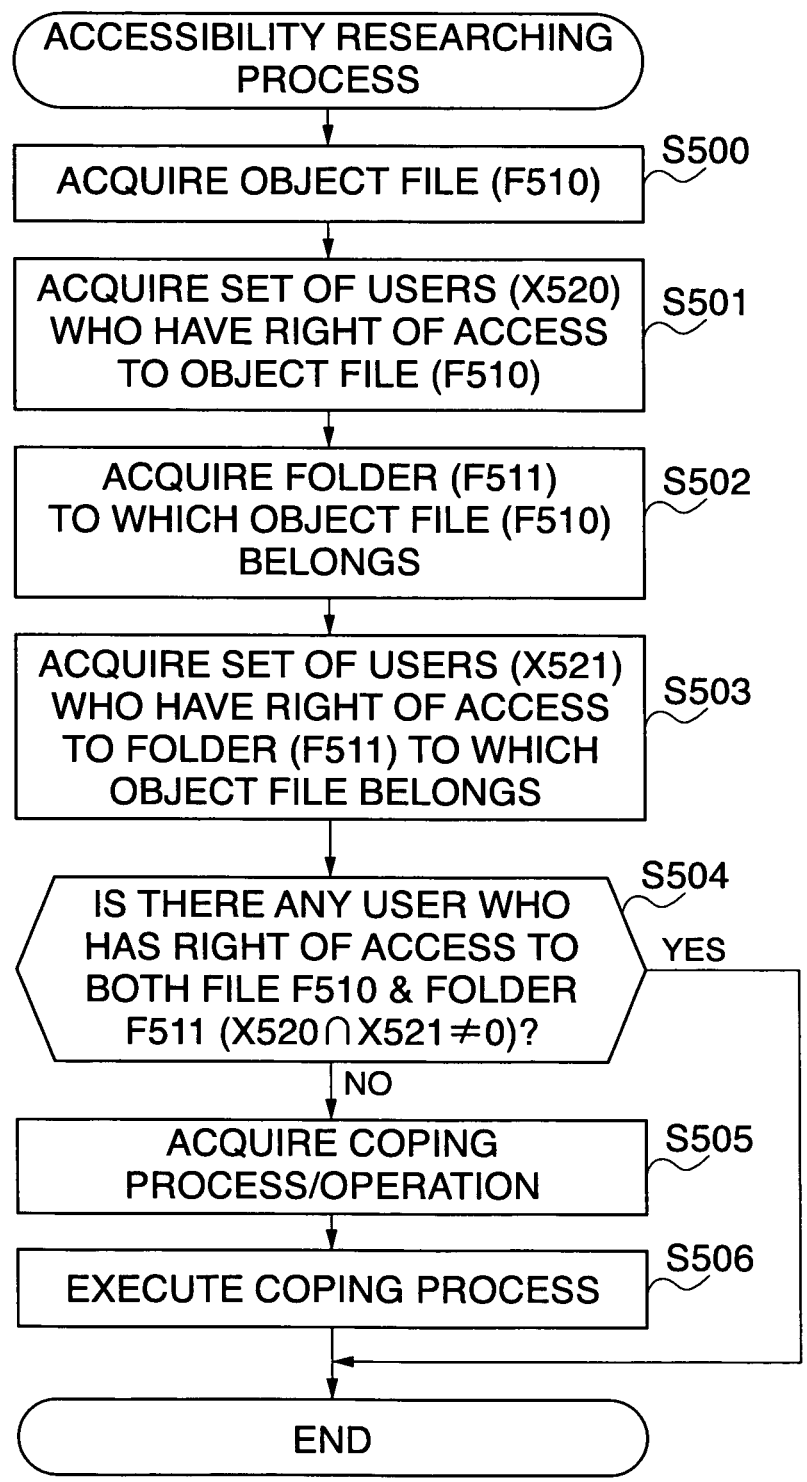
FIG. 2 is a flow chart showing the procedure of an accessibility researching process carried out by the document managing system according to the first embodiment of the present invention.

FIG. 2 is a flow chart showing the procedure of the accessibility researching process carried out by the document managing system according to the first embodiment of the present invention.

As shown in FIG. 2, first, a file to be researched is determined (step S500) (research object acquiring unit). In the present embodiment, an inquiry is made of each of the user terminals 400 to 402 of the document managing system about a file to be researched, and a file to be researched is determined according to the contents of a reply in response to the inquiry. Specifically, the document managing system 403 displays a message on the display to prompt the user to designate a file to be researched using the keyboard or pointing device, so that the user selects a file to be researched. Therefore, even if the user is not a privileged user like an administrator, he/she can check whether or not there is any user who can access any file or folder in the document database 404.

This research object determining method should not be limited to the above described method of the present embodiment, but the document managing system 403 may read a research object from a file in which research objects are written, or a research object may be called as a part of another processing by executing the processing. In the present embodiment, it is assumed that the research object is a file, that is, a file F510.

A set X520 of users for which the right of access to the file F510 to be researched has been set is acquired (step S501) (file user set acquiring unit), then a folder F511 to which the file F510 to be researched belongs is acquired (step S502) (folder acquiring unit), and a set X521 of users for which the right of access to the acquired folder F511 has been set is acquired (step S503) (folder user set acquiring unit).

In a step S504, it is determined whether or not there is any user for which the right of access to both the file F510 to be researched and the folder F511 to which the file F510 to be researched belong has been set, and more specifically, whether $X520 \cap X521$ is an empty set ($\emptyset$) or not. If it is determined that there is no user who can access both the file F510 and the folder F511, i.e. $X520 \cap X521$ is an empty set ($\emptyset$), the process proceeds to a step S505, and if not, the process is immediately terminated.

In the next step S505, a process for coping with the case where there is no user who can access both the file F510 and the folder F511 is acquired, and then the process acquired in the step S505 is executed, followed by termination of the process (step S506).

In the step S505, an inquiry is made of each of the user terminals 400 to 402 of the document managing system 403, and a process is determined according to the contents of a reply in response to the inquiry. This inquiry is made by screen display, printing, sound output, log recording, mail transmission, or the like.

The above process determining method should not be limited to the present embodiment, but for example, a predetermined process for coping with the above case may be loaded from e.g. a memory or a HDD.

Examples of the process for coping with the case include application of an access right, owner change, file or folder migration, and file or folder deletion. As a result of the process, inaccessible files and folders can be surely eliminated.

According to the process of FIG. 2, when the intersection of the user set X520 for which the right of access to the file F510 to be researched has been set and the user set X521 for which the right of access to the folder F511 to which the file F510 belongs has been set is an empty set ("No" to the step S504), it is determined that there is no user who can access the folder F511, and thus the presence of an inaccessible file can be detected, to thereby enable positive elimination of inaccessible files and folders.

Further, although in the present embodiment, the object of research is a file, the object of research may be a folder, and a set of users who have the right of access to this folder may be the user set X520. In this case, a parent folder of a folder to be researched is acquired in the step S502, and a user set X522 for which the right of access to the parent folder has been set is acquired in the step S503. Also, in the step S504, it is determined whether or not there is any user who has the right of access to both the folder to be researched and the parent folder of the folder to be researched, and more specifically, whether $X520 \cap X522$ is an empty set ($\emptyset$) or not. As a result, the presence of an inaccessible folder can be detected.

Figure 3:
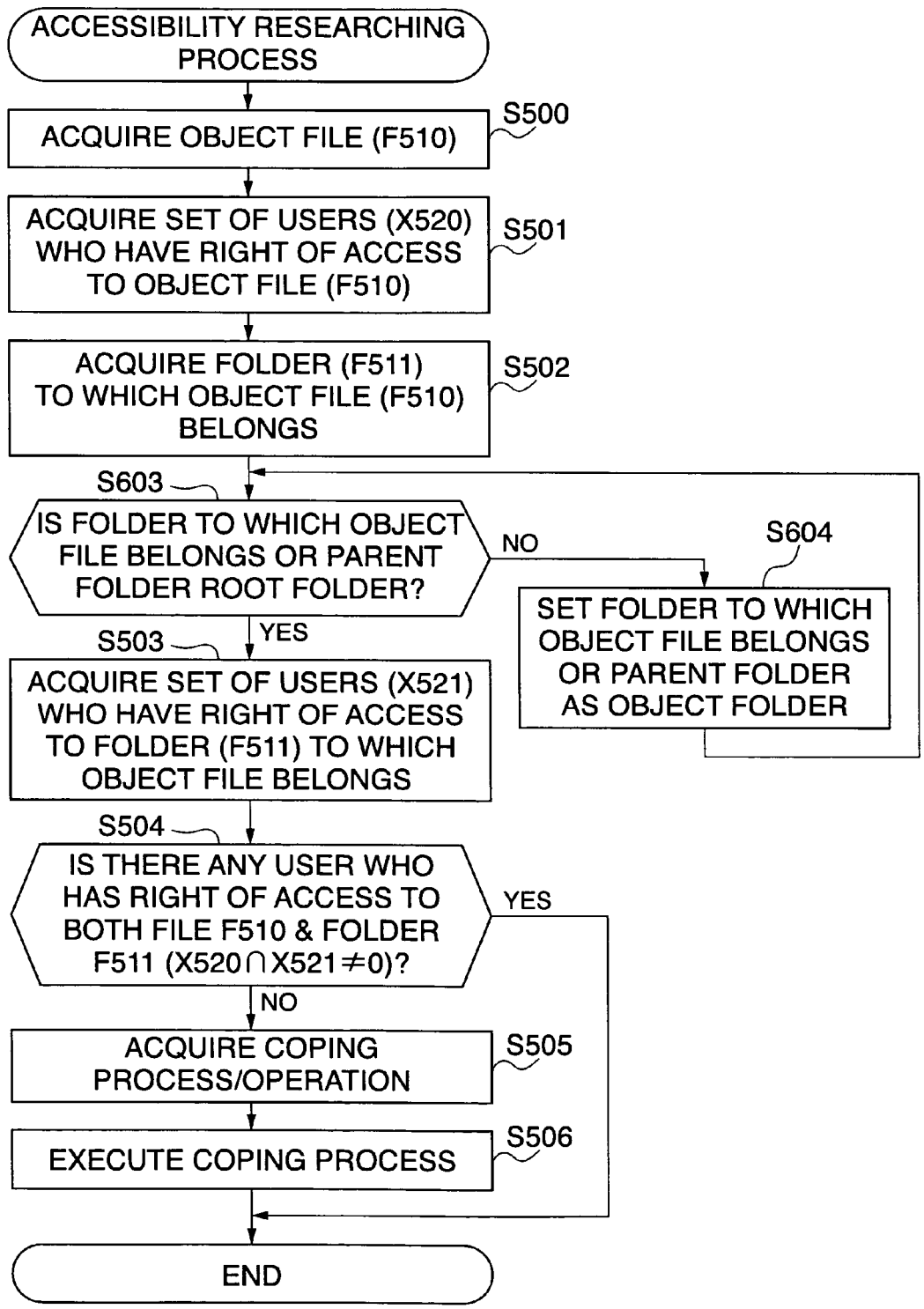
FIG. 3 is a flow chart showing the procedure of an accessibility researching process carried out by a document managing system according to a second embodiment of the present invention.

FIG. 3 is a flow chart showing the procedure of an accessibility researching process carried out by a document managing system according to a second embodiment of the present invention.

The process described below is basically identical with the process of the FIG. 2 flow chart except that the accessibility of one file or one folder is recursively researched, and therefore corresponding processing steps are denoted by identical step numbers and description thereof is omitted.

In FIG. 3, first, the same processing as in the steps S500 to S502 in FIG. 2 is executed, and then it is determined whether a folder to which a file to be researched belong or a parent folder of the folder to be researched is a root folder (step S603). If it is determined that the folder to which the file to be researched belongs or the parent folder of the folder to be researched is not a root folder, the folder to which the file to be researched belongs or the parent folder of the folder to be researched is set as the folder to be researched (step S604), and the processing in the steps S603 and S604 is recursively executed until the folder to be researched is set as a root folder.

On the other hand, if it is determined in the step S603 that the folder to which the file to be researched belongs or the parent folder of the folder to be researched is a root folder, the process proceeds to the step S503, and the steps S504 to S506 are executed, followed by termination of the process.

According to the process of FIG. 3, it is possible to acquire a user set X621 for which the right of access to a file or a folder to be researched has been set by actually tracing from a root folder.

Figure 4:
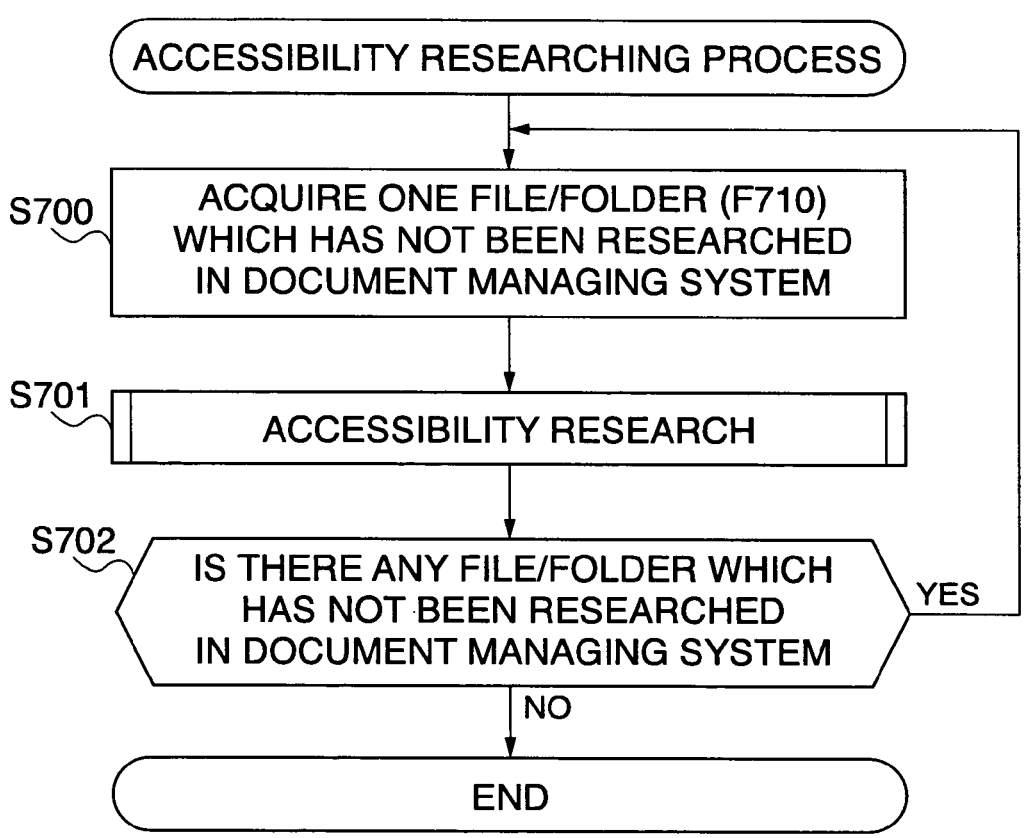
FIG. 4 is a flow chart showing the procedure of an accessibility researching process carried out by a document managing system according to a third embodiment of the present invention.

FIG. 4 is a flow chart showing the procedure of an accessibility researching process carried out by a document managing system according to a third embodiment of the present invention.

As shown in FIG. 4, first, one file or folder in the document managing system 403 is selected, and if an accessibility research has not been conducted for the selected file or folder F710 (step S700), an accessibility research is conducted for the file or folder F710 by the accessibility researching process according to the second embodiment (FIG. 3) (step S701). It should be noted that in the step S701, the accessibility research may be conducted by the accessibility researching process (FIG. 2) according to the first embodiment or an accessibility researching process (FIG. 5) according to a fourth embodiment, described later.

Then, it is determined whether there is any file or folder which has not yet been researched in the document managing system 402 (step S702). If there is a file or a folder which has not been researched, the process proceeds to the step S700, and if not, the process is terminated.

According to the process of FIG. 4, it is possible to surely detect inaccessible files or folders from among all the files or folders in the document database 404.

Figure 5:
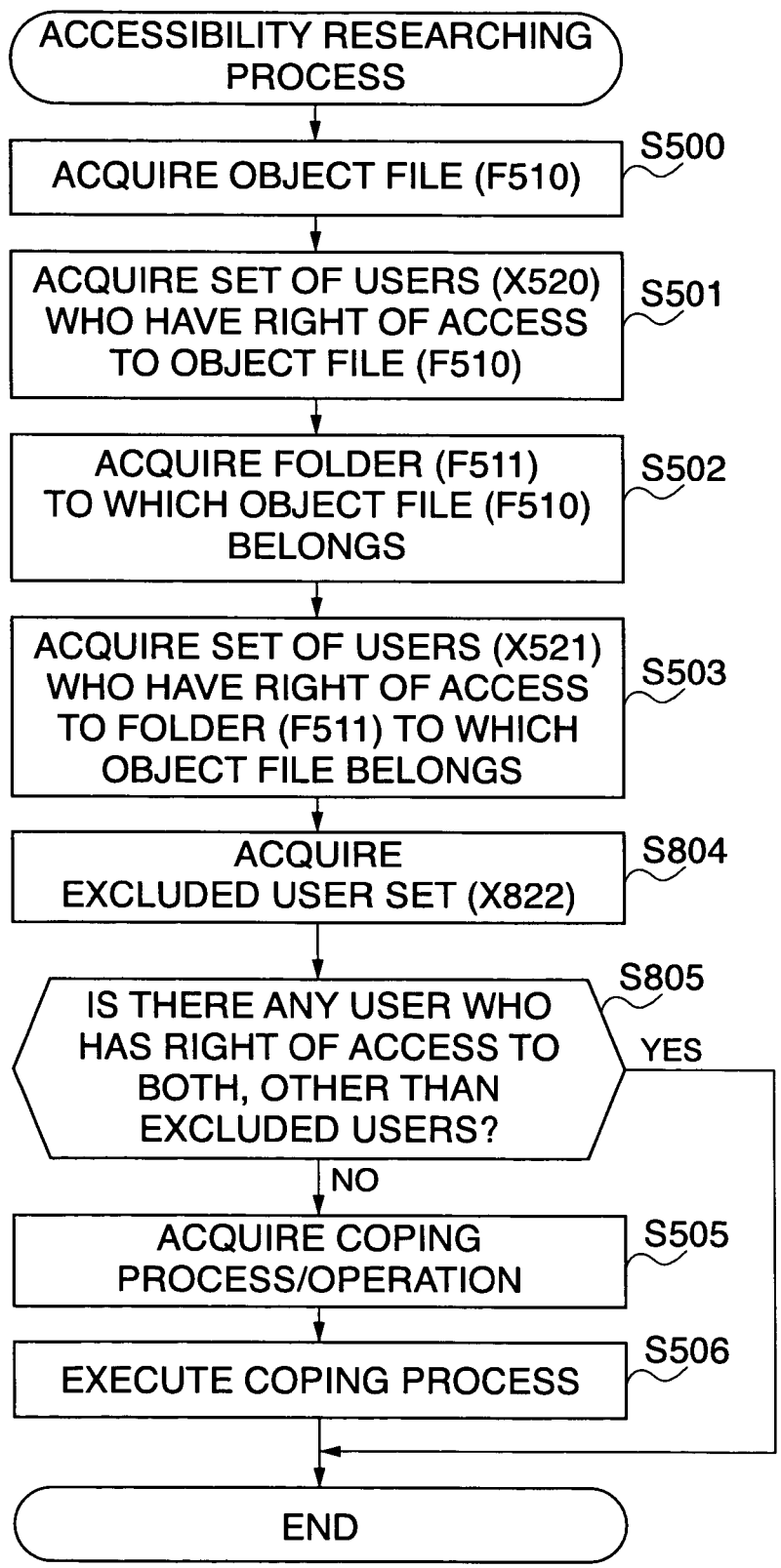
FIG. 5 is a flow chart showing the procedure of an accessibility researching process carried out by a document managing system according to a fourth embodiment of the present invention.

FIG. 5 is a flow chart showing the procedure of an accessibility researching process carried out by a document managing system according to a fourth embodiment of the present invention.

The process described below is basically identical with the process of the FIG. 2 flow chart except that there are users who are excluded from an accessibility research, and therefore corresponding processing steps are denoted by identical step numbers and description thereof is omitted.

As shown in FIG. 5, first, the same processing as in the steps S500 to S503 in FIG. 2 is executed, and then a set X822 of users excluded from an accessibility research is acquired (step S804). The excluded users are acquired e.g. by loading from a storage device or a memory in which settings are written.

It is determined whether or not there is any user (ordinary user) other than the excluded users, who can access both the file F510 to be researched and the folder F511 to which the file F510 belongs (step S805). Specifically, it is determined whether an intersection of the complementary set X822 and the sets X520 and X521 is empty or not.

If it is determined that there are no users who have the right of access to both the file F510 and the folder F511 other than the excluded users, i.e. if the above-mentioned intersection is empty, the steps S505 and S506 are executed, followed by termination of the process. If not, the process is terminated.

According to the process of FIG. 5, it is possible to surely detect the presence of files and folders which cannot be accessed by so-called ordinary users other than users such as an administrator, who are included in the set X822.

Figure 6:
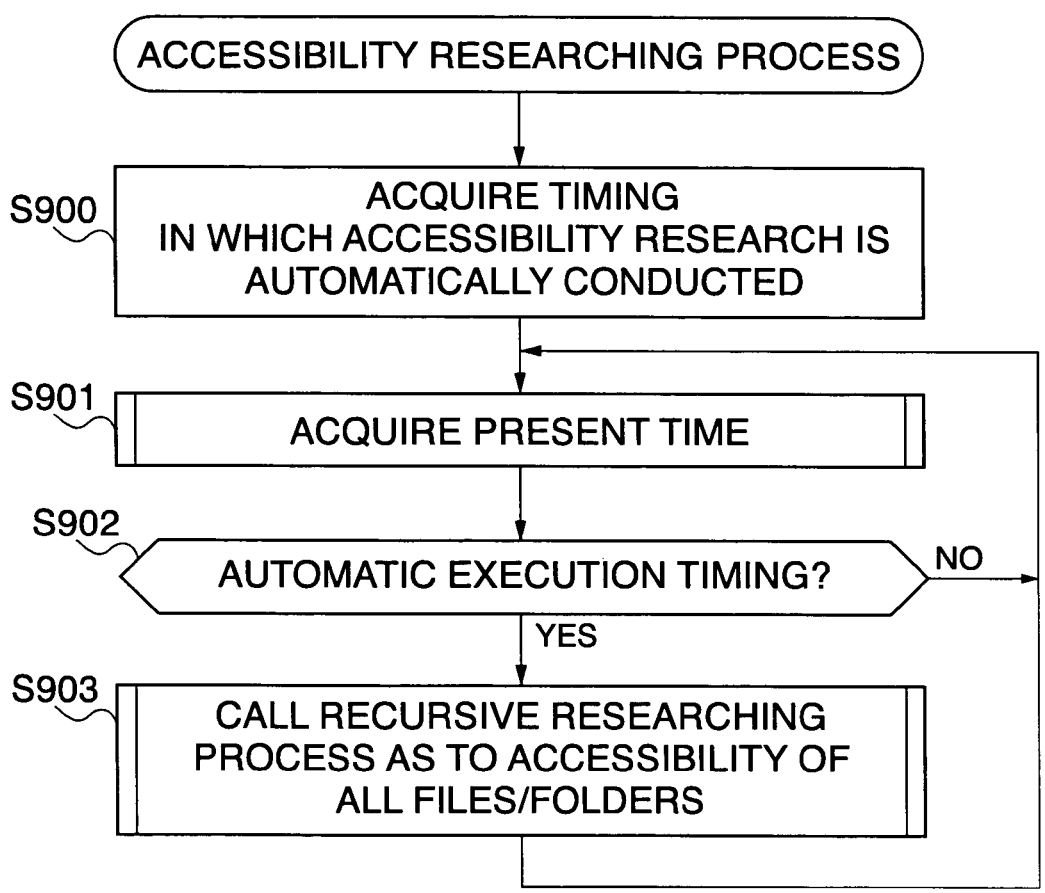
FIG. 6 is a flow chart showing the procedure of an accessibility researching process carried out by a document managing system according to a fifth embodiment of the present invention.
Figure 7:
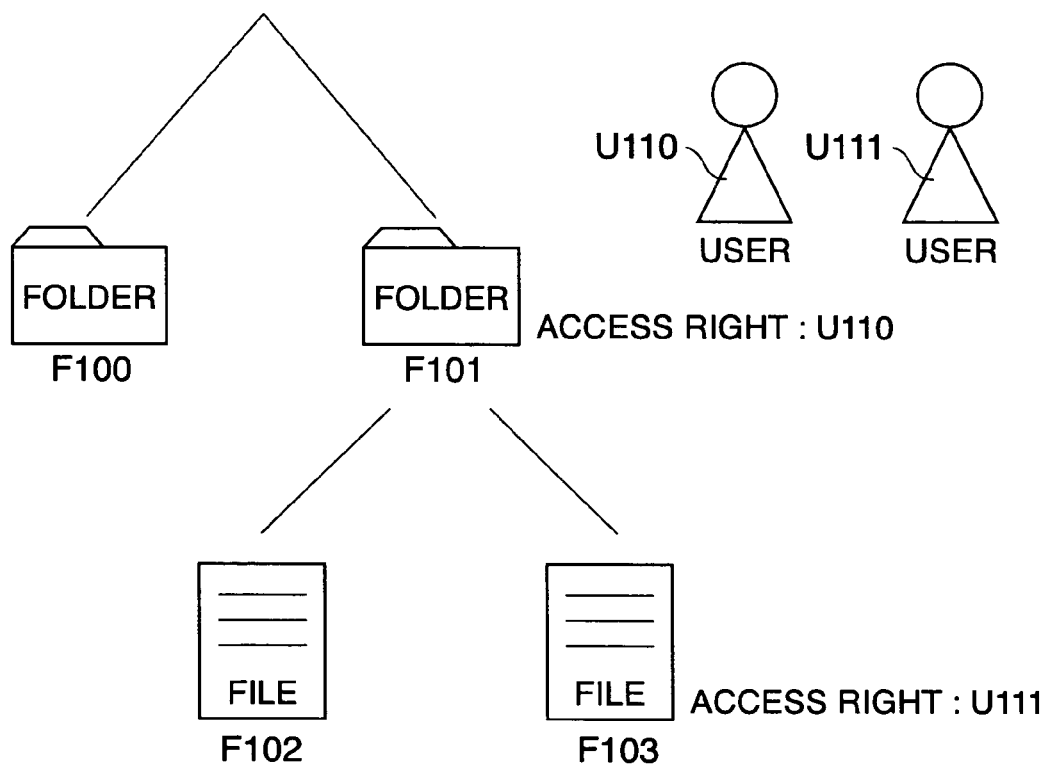
FIG. 7 is a diagram showing the arrangement of files and folders in a conventional document managing system.
Figure 8:
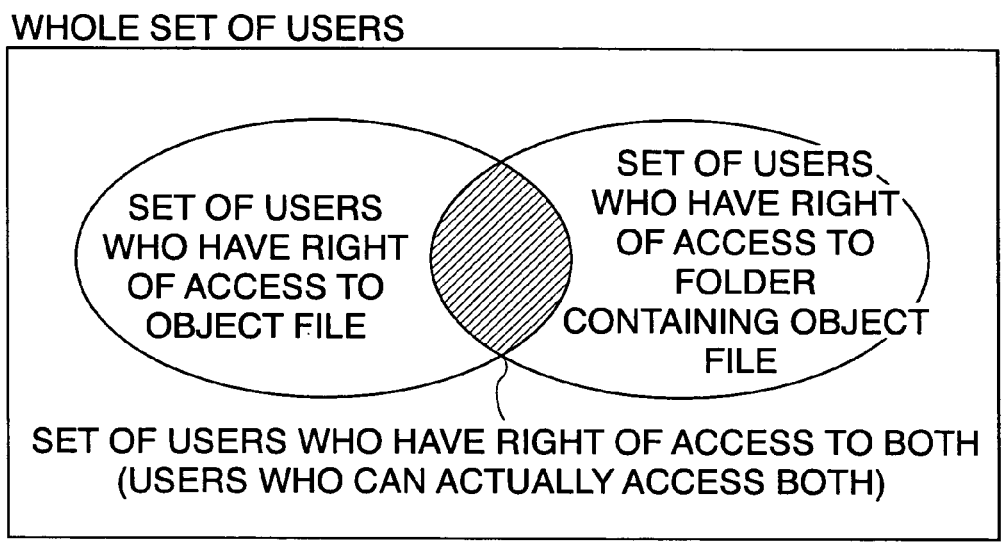
FIG. 8 is a Venn diagram showing examples of files and folders which can be accessed by users in the conventional document managing system.
Figure 9:
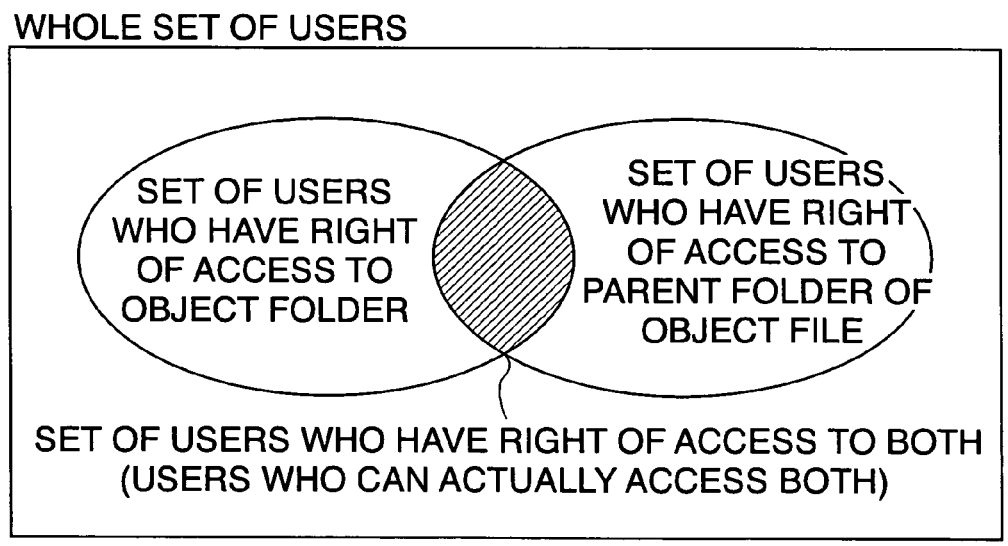
FIG. 9 is a Venn diagram showing examples of files and folders which can be accessed by users in the conventional document managing system.

FIG. 6 is a flow chart showing the procedure of an accessibility researching process carried out by a document managing system according to a fifth embodiment of the present invention.

In FIG. 6, first, timing in which an accessibility research is automatically conducted is acquired (step S900). For example, the timing is acquired by loading from a storage device or a memory in which settings are written or by receiving an input from a user.

Then, the present time is acquired (step S901), and whether or not the present time corresponds to timing in which the accessibility research should be conducted is determined according to the automatic execution timing acquired in the step S900 and the present time acquired in the step S901 (step S902). If it is determined that the present time corresponds to the timing in which the accessibility research should be conducted, the process proceeds to a step S903, and if not, the step S901 and the subsequent steps are executed again.

In the step S903, the accessibility research is conducted by the accessibility researching process according to the third embodiment, and then the step S901 and the subsequent steps are executed again.

According to the process of FIG. 6, even if the user does not designate timing in which it is determined whether or not there is any user who can access files or folders, the presence of inaccessible files and folders can be surely detected.

It is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and a storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be supplied by downloading via a network.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2004-093213 filed Mar. 26, 2004, which is hereby incorporated by reference herein.

What is claimed is:

1. A document managing system that manages a plurality of tree-structured folders and files stored in a database apparatus, and separately sets rights of access to the respective files and rights of access to the respective folders to be managed, the document management system comprising:
a microprocessor coupled with a memory,
wherein the microprocessor is programmed to automatically determine an inaccessible file from the files stored in the database apparatus by:
acquiring a file from the files stored in the database apparatus as a research file;
acquiring a first set of users for which a right of access to the research file has been set, the first set of users including at least one user;
acquiring a folder to which the research file belongs, from the folders stored in the database apparatus;
acquiring a second set of users for which a right of access to the acquired folder has been set, the second set of users including at least one user, wherein the right of access to the research file and the right of access to the acquired folder have been set separately;
determining whether any user among the first set of users is in the second set of users;
detecting the research file as an inaccessible file when no user among the first set of users is in the second set of users, the inaccessible file being a file that no user can access;
detecting all inaccessible files from all of the files stored in the database apparatus by repeating above until all of the files are each treated as the research file;
notifying, in case at least one inaccessible file is detected, a user that the inaccessible file is in the database apparatus;
acquiring a coping process based on a reply from the notified user; and
executing the acquired coping process so that no inaccessible file exists in the database apparatus,
wherein the coping process includes at least one of application of an access right, owner change, file migration, or file deletion.

2. A document managing system according to claim 1, wherein the notifying process is executed using screen display, printing, sound output, log recording, or mail transmission.

3. A document managing system according to claim 1, wherein:
the microprocessor is further programmed to acquire a third set of users to be excluded, and
the microprocessor detects the research file as the inaccessible file when no user among the first set other than the third set of users is in the second set.

4. A document managing system according to claim 1, wherein the microprocessor is further programmed to:
acquire timing in which whether the research file is determined to be the inaccessible file; and
acquire a present time at regular intervals,
wherein the microprocessor executes acquiring of the file, acquiring of the first set of users, acquiring of the folder, acquiring of the second set of users, and determines whether any user among the first set of users is in the second set of users.

5. A document managing system that manages a plurality of tree-structured folders and files stored in a database apparatus, and separately sets rights of access to the respective folders to be managed, the document management system comprising:
a microprocessor coupled with a memory,
wherein the microprocessor is programmed to automatically determine an inaccessible folder from the folders stored in the database apparatus by:
acquiring a folder from the folders stored in the database apparatus as a research folder;
acquiring a first set of users for which a right of access to the research folder has been set, the first set of users including at least one user;
acquiring a parent folder of the folder acquired as the research folder;
acquiring a second set of users for which a right of access to the acquired parent folder has been set, the second set of users including at least one user, wherein the right of access to the research file and the right of access to the acquired folder have been set separately;
determining whether any user among the first set of users is in the second set of users;
detecting the research folder as an inaccessible folder when no user among the first set of users is in the second set of users, the inaccessible folder being a folder that no user can access;
detecting all inaccessible folders from all of the folders stored in the database apparatus by repeating above until all of the folders are each treated as the research folder;
notifying, in case at least one inaccessible folder is detected, a user that the inaccessible folder is in the database apparatus;
acquiring a coping process based on a reply from the notified user; and
executing the acquired coping process so that no inaccessible folder exists in the database apparatus,
wherein the coping process includes at least one of application of an access right, owner change, folder migration, or folder deletion.

6. A document managing system that manages a plurality of tree-structured folders and files stored in a database apparatus, and separately sets rights of access to the respective files and rights of access to the respective folders to be managed, the document management system comprising:
a microprocessor coupled with a memory,
wherein the microprocessor is programmed to automatically determine an inaccessible file from the files stored in the database apparatus by:
acquiring a file from the files stored in the database apparatus as a research file;
acquiring a first set of users for which a right of access to the research file has been set, the first set of users including at least one user;
acquiring a folder to which the research file belongs from the folders stored in the database apparatus;
recursively acquiring, when the acquired folder is not a root folder, a parent folder of the acquired folder until the acquired folder becomes the root folder;
acquiring a second set of users for which a right of access to the acquired root folder has been set, the second set of users including at least one user, wherein the right of access to the research file and the right of access to the acquired folder have been set separately;

determining whether any user among the first set of users is in the second set of users;

detecting the research file as an inaccessible file when no user among the first set of users is in the second set of users, the inaccessible file being a file that no user can access;

detecting all inaccessible files from all of the files stored in the database apparatus by repeating above until all of the files are each treated as the research file;

notifying, in case at least one inaccessible file is detected, a user that the inaccessible file is in the database apparatus;

acquiring a coping process based on a reply from the notified user; and executing the acquired coping process so that no inaccessible file exists in the database apparatus, wherein the coping process includes at least one of application of an access right, owner change, file migration, or file deletion.

7. A document managing system that manages a plurality of tree-structured folders and files stored in a database apparatus, and separately sets rights of access to the respective folders to be managed, the document management system comprising:

a microprocessor coupled with a memory, wherein the microprocessor is programmed to automatically determine an inaccessible folder from the folders stored in the database apparatus by:

acquiring a folder from the folders stored in the database apparatus as a research folder;

acquiring a first set of users for which a right of access to the research folder has been set, the first set of users including at least one user;

acquiring a parent folder of the folder acquired as the research folder;

recursively acquiring, when the acquired folder is not a root folder, a parent folder of the acquired folder until the acquired folder becomes the root folder;

acquiring a second set of users for which a right of access to the acquired root folder has been set, the second set of users including at least one user, wherein the right of access to the research file and the right of access to the acquired folder have been set separately;

determining whether any user among the first set of users is in the second set of users;

detecting the research folder as an inaccessible folder when no user among the first set of users is in the second set of users, the inaccessible folder being a folder that no user can access;

detecting all inaccessible folders from all of the folders stored in the database apparatus by repeating above until all of the folders are each treated as the research folder;

notifying, in case at least one inaccessible folder is detected, a user that the inaccessible folder is in the database apparatus;

acquiring a coping process based on a reply from the notified user; and executing the acquired coping process so that no inaccessible folder exists in the database apparatus, wherein the coping process includes at least one of application of an access right, owner change, folder migration, or folder deletion.

8. A document managing method of managing a plurality of tree-structured folders and files stored in a database apparatus, and separately setting rights of access to the respective files and rights of access to the respective folders to be managed with a document managing system comprising a microprocessor connected to a memory, the method comprising:

a research file acquiring step of acquiring a file from the files stored in the database apparatus as a research file;

a first set acquiring step of acquiring a first set of users for which a right of access to the research file has been set, the first set of users including at least one user;

a folder acquiring step of acquiring a folder to which the research file belongs;

a second set acquiring step of acquiring a second set of users for which a right of access to the acquired folder has been set, the second set of users including at least one user, wherein the right of access to the research file and the right of access to the acquired folder have been set separately;

a determining step of determining whether any user among the first set of users is in the second set of users;

a detecting step of detecting the research file as an inaccessible file when no user among the first set of users is in the second set of users, the inaccessible file being a file that no user can access;

a repeating step of detecting all inaccessible files from all of the files stored in the database apparatus by repeatedly executing the research file acquiring step, the first set acquiring step, the folder acquiring step, the second set acquiring step, the determining step, and the detecting step, until all of the files are each treated as the research file;

a notifying step of notifying, in case at least one inaccessible file is detected, a user that the inaccessible file is in the database apparatus;

an acquiring step of acquiring a coping process based on a reply from the notified user; and an executing step of executing the acquired coping process so that no inaccessible file exists in the database apparatus, wherein the coping process includes at least one of application of an access right, owner change, file migration, or file deletion.

9. A document managing method according to claim 8, wherein the notifying step is executed using screen display, printing, sound output, log recording, or mail transmission.

10. A document managing method according to claim 8, further comprising:

an excluded user acquiring step of acquiring a third set of users to be excluded, wherein said detecting step determines the research file as an inaccessible file when no user among the first set other than the third set of users is in the second set.

11. A document managing method according to claim 8, further comprising:

a timing acquiring step of acquiring timing in which the detecting step determines whether the research file is the inaccessible file; and a present time acquiring step of acquiring a present time at regular intervals, wherein the research object acquiring step, the first set acquiring step, the folder acquiring step, the second set acquiring step, the determining step, and the detecting step are executed when the acquired present time corresponds to the acquired timing.

12. A document managing method of managing a plurality of tree-structured folders and files stored in a database apparatus, and separately setting rights of access to the respective folders to be managed with a document managing system comprising a microprocessor connected to a memory, the method comprising:

a research folder acquiring step of acquiring a folder from the folders stored in the database apparatus as a research folder;

a first set acquiring step of acquiring a first set of users for which a right of access to the research folder has been set, the first set of users including at least one user;

a parent folder acquiring step of acquiring a parent folder of the folder acquired as the research folder in said research folder acquiring step;

a second set acquiring step of acquiring a second set of users for which a right of access to the parent folder acquired by said parent folder acquiring step has been set, the second set of users including at least one user, wherein the right of access to the research file and the right of access to the acquired folder have been set separately;

a determining step of determining whether any user among the first set of users is in the second set of users;

a detecting step of detecting the research folder as an inaccessible folder when no user among the first set of users is in the second set of users, the inaccessible folder being a folder that no user can access;

a repeating step of detecting all inaccessible folders from all of the folders stored in the database apparatus by repeatedly executing the research folder acquiring step, the first set acquiring step, the parent folder acquiring step, the second set acquiring step, the determining step, and the detecting step, until all of the folders are each treated as the research folder;

a notifying step of notifying, in case at least one inaccessible folder is detected, a user that the inaccessible folder is in the database apparatus;

an acquiring step of acquiring a coping process based on a reply from the notified user; and an executing step of executing the acquired coping process so that no inaccessible folder exists in the database apparatus, wherein the coping process includes at least one of application of an access right, owner change, folder migration, or folder deletion.

13. A document managing method of managing a plurality of tree-structured folders and files stored in a database apparatus, and separately setting rights of access to the respective files and rights of access to the respective folders to be managed with a document managing system comprising a microprocessor connected to a memory, the method comprising:

a research file acquiring step of acquiring a file from the files stored in the database apparatus as a research file;

a first set acquiring step of acquiring a first set of users for which a right of access to the research file has been set, the first set of users including at least one user;

a folder acquiring step of acquiring a folder to which the research file belongs;

a recursive parent folder acquiring step of recursively acquiring a parent folder of the acquired folder until the acquired folder becomes the root folder when the acquired folder is not a root folder;

a second set acquiring step of acquiring a second set of users for which a right of access to the acquired root folder has been set, the second set of users including at least one user, wherein the right of access to the research file and the right of access to the acquired folder have been set separately;

a determining step of determining whether any user among the first set of users is in the second set of users;

a detecting step of detecting the research file as an inaccessible file when no user among the first set of users is in the second set of users, the inaccessible file being a file that no user can access;

a repeating step of detecting all inaccessible files from all of the files stored in the database apparatus by repeatedly executing the research file acquiring step, the first set acquiring step, the folder acquiring step, the recursive parent folder acquiring step, the second set acquiring step, the determining step, and the detecting step, until all of the files are each treated as the research file;

a notifying step of notifying, in case at least one inaccessible file is detected, a user that the inaccessible file is in the database apparatus;

an acquiring step of acquiring a coping process based on a reply from the notified user; and an executing step of executing the acquired coping process so that no inaccessible file exists in the database apparatus, wherein the coping process includes at least one of application of an access right, owner change, file migration, or file deletion.

14. A document managing method of managing a plurality of tree-structured folders and files stored in a database apparatus, and separately setting rights of access to the respective folders to be managed with a document managing system comprising a microprocessor connected to a memory, the method comprising:

a research acquiring step of acquiring a folder from the folders stored in the database apparatus as a research folder;

a first set acquiring step of acquiring a first set of users for which a right of access to the research folder has been set, the first set of users including at least one user;

a parent folder acquiring step of acquiring a parent folder of the folder acquired as the research folder in said research folder acquiring step;

a recursive parent folder acquiring step of recursively acquiring a parent folder of the folder until the acquired folder becomes the root folder when the folder is not a root folder;

a second set acquiring step of acquiring a second set of users for which a right of access to the acquired root folder has been set, the second set of users including at least one user, wherein the right of access to the research file and the right of access to the acquired folder have been set separately;

a determining step of determining whether any user among the first set of users is in the second set of users;

a detecting step of detecting the research folder as an inaccessible folder when no user among the first set of users is in the second set of users, the inaccessible folder being a folder that no user can access;

a repeating step of detecting all inaccessible folders from all of the folders stored in the database apparatus by repeatedly executing the research folder acquiring step, the first set acquiring step, the parent folder acquiring step, the recursive parent folder acquiring step, the second set acquiring step, the determining step, and the detecting step, until all of the folders are each treated as the research folder;

a notifying step of notifying, in case at least one inaccessible folder is detected, a user that the inaccessible folder is in the database apparatus;

an acquiring step of acquiring a coping process based on a reply from the notified user; and an executing step of executing the acquired coping process so that no inaccessible folder exists in the database apparatus, wherein the coping process includes at least one of application of an access right, owner change, folder migration, or folder deletion.

15. A non-transitory computer-readable storage medium storing a computer program for managing a plurality of tree-structured folders and files stored in a database apparatus, and separately setting rights of access to the respective files and rights of access to the respective folders to be managed, the computer program comprising:

a research file acquiring module for acquiring a file from the files stored in the database apparatus as a research file;

a first set acquiring module for acquiring a first set of users for which a right of access to the research file has been set, the first set of users including at least one user;

a folder acquiring module for acquiring a folder to which the research file belongs;

a second set acquiring module for acquiring a second set of users for which a right of access to the acquired folder has been set, the second set of users including at least one user, wherein the right of access to the research file and the right of access to the acquired folder have been set separately;

a determining module for determining whether any user among the first set of users is in the second set of users;

a detecting module for detecting the research file as an inaccessible file when no user among the first set of users is in the second set of users, the inaccessible file being a file that no user can access;

a repeating module for detecting all inaccessible files from all of the files stored in the database apparatus by repeatedly executing the research file acquiring module, the first set acquiring module, the folder acquiring module, the second set acquiring module, the determining module, and the detecting module, until all of the files are each treated as the research file;

a notifying module for notifying, in case at least one inaccessible file is detected, a user that the inaccessible file is in the database apparatus;

an acquiring module for acquiring a coping process based on a reply from the notified user; and an executing module for executing the acquired coping process so that no inaccessible file exists in the database apparatus, wherein the coping process includes at least one of application of an access right, owner change, file migration, or file deletion.

16. A non-transitory computer-readable storage medium storing a computer program for managing a plurality of tree-structured folders and files stored in a database apparatus, and separately setting rights of access to the respective folders to be managed, the computer program comprising:

a research folder acquiring module for acquiring a folder from the folders stored in the database apparatus as a research folder;

a first set acquiring module for acquiring a first set of users for which a right of access to the research folder has been set, the first set of users including at least one user;

a parent folder acquiring module for acquiring a parent folder of the folder acquired as the research folder in said research folder acquiring module;

a second set acquiring module for acquiring a second set of users for which a right of access to the parent folder acquired by said parent folder acquiring module has been set, the second set of users including at least one user, wherein the right of access to the research file and the right of access to the acquired folder have been set separately;

a determining module for determining whether any user among the first set of users is in the second set of users;

a detecting module for detecting the research folder as an inaccessible folder when no user among the first set of users is in the second set of users, the inaccessible folder being a folder that no user can access;

a repeating module for detecting all inaccessible folders from all of the folders stored in the database apparatus by repeatedly executing the research folder acquiring module, the first set acquiring module, the parent folder acquiring module, the second set acquiring module, the determining module, and the detecting module, until all of the folders are each treated as the research folder;

a notifying module for notifying, in case at least one inaccessible folder is detected, a user that the inaccessible folder is in the database apparatus;

an acquiring module for acquiring a coping process based on a reply from the notified user; and an executing module for executing the acquired coping process so that no inaccessible folder exists in the database apparatus, wherein the coping process includes at least one of application of an access right, owner change, folder migration, or folder deletion.

17. A non-transitory computer-readable storage medium storing a computer program for managing a plurality of tree-structured folders and files stored in a database apparatus, and separately setting rights of access to the respective files and rights of access to the respective folders to be managed, the computer program comprising:

a research file acquiring module for acquiring a file from the files stored in the database apparatus as a research file;

a first set acquiring module for acquiring a first set of users for which a right of access to the research file has been set, the first set of users including at least one user;

a folder acquiring module for acquiring a folder to which the research file belongs;

a recursive parent folder acquiring module for recursively acquiring a parent folder of the acquired folder until the acquired folder becomes the root folder when the acquired folder is not a root folder;

a second set acquiring module for acquiring a second set of users for which a right of access to the acquired root folder has been set, the second set of users including at least one user, wherein the right of access to the research file and the right of access to the acquired folder have been set separately;

a determining module for determining whether any user among the first set of users is in the second set of users;

a detecting module for detecting the research file as an inaccessible file when no user among the first set of users is in the second set of users, the inaccessible file being a file that no user can access;

a repeating module for detecting all inaccessible files from all of the files stored in the database apparatus by repeatedly executing the research file acquiring module, the first set acquiring module, the folder acquiring module, the recursive parent folder acquiring module, the second set acquiring module, the determining module, and the detecting module, until all of the files are each treated as the research file;

a notifying module for notifying, in case at least one inaccessible file is detected, a user that the inaccessible file is in the database apparatus;

an acquiring module for acquiring a coping process based on a reply from the notified user; and an executing module for executing the acquired coping process so that no inaccessible file exists in the database apparatus, wherein the coping process includes at least one of application of an access right, owner change, file migration, or file deletion.

18. A non-transitory computer-readable storage medium storing a computer program for managing a plurality of tree-structured folders and files stored in a database apparatus, and separately setting rights of access to the respective folders to be managed, the computer program comprising:

a research folder acquiring module for acquiring a folder from the folders stored in the database apparatus as a research folder;

a first set acquiring module for acquiring a first set of users for which a right of access to the research folder has been set, the first set of users including at least one user;

a parent folder acquiring module for acquiring a parent folder of the folder acquired as the research folder in said research folder acquiring module;

a recursive parent folder acquiring module for recursively acquiring a parent folder of the folder until the acquired folder becomes the root folder when the folder is not a root folder;

a second set acquiring module for acquiring a second set of users for which a right of access to the acquired root folder has been set, the second set of users including at least one user, wherein the right of access to the research file and the right of access to the acquired folder have been set separately;

a determining module for determining whether any user among the first set of users is in the second set of users;

a detecting module for detecting the research as an inaccessible folder when no user among the first set of the users is in the second set of users, the inaccessible folder being a folder that no user can access;

a repeating module for detecting all inaccessible folders from all of the folders stored in the database apparatus by repeatedly executing the research file acquiring module, the first set acquiring module, the parent folder acquiring module, the recursive parent folder acquiring module, the second set acquiring module, the determining module, and the detecting module, until all of the folders are each treated as the research folder;

a notifying module for notifying, in case at least one inaccessible folder is detected, a user that the inaccessible folder is in the database apparatus;

an acquiring module for acquiring a coping process based on a reply from the notified user; and an executing module for executing the acquired coping process so that no inaccessible folder exists in the database apparatus, wherein the coping process includes at least one of application of an access right, owner change, folder migration, or folder deletion.

* * * * *